US012618525B2

(12) United States Patent
Bleischwitz et al.

(10) Patent No.: US 12,618,525 B2
(45) Date of Patent: May 5, 2026

(54) PRESSURE TANK FOR GAS-OPERATED VEHICLE

(71) Applicant: Voith Patent GmbH, Heidenheim (DE)

(72) Inventors: Mark Bleischwitz, Munich (DE); Thomas Lanzl, Wald (DE); Jürgen Brühler, Unterschleissheim (DE); Gordej Klein, Marzling (DE)

(73) Assignee: Voith Hystech GmbH, Garching (DE)

( * ) Notice: Subject to any disclaimer, the term of this patent is extended or adjusted under 35 U.S.C. 154(b) by 120 days.

(21) Appl. No.: 18/258,879

(22) PCT Filed: Dec. 15, 2021

(86) PCT No.: PCT/EP2021/085836
§ 371 (c)(1),
(2) Date: Jun. 22, 2023

(87) PCT Pub. No.: WO2022/136045
PCT Pub. Date: Jun. 30, 2022

(65) Prior Publication Data

US 2024/0044455 A1 Feb. 8, 2024

(30) Foreign Application Priority Data

Dec. 22, 2020 (DE) ..................... 10 2020 134 633.6

(51) Int. Cl.
*F17C 13/04* (2006.01)

(52) U.S. Cl.
CPC ...... *F17C 13/04* (2013.01); *F17C 2201/0109* (2013.01); *F17C 2203/0604* (2013.01);
(Continued)

(58) Field of Classification Search
CPC .............. F17C 13/04; F17C 2201/0109; F17C 2203/0604; F17C 2203/0673;
(Continued)

(56) References Cited

U.S. PATENT DOCUMENTS 4,614,279 A 9/1986 Toth et al.
5,938,209 A 8/1999 Sirosh et al.
(Continued)

FOREIGN PATENT DOCUMENTS

DE 102010021667 A1 12/2010
DE 102014009343 B4 3/2016
(Continued)

OTHER PUBLICATIONS

English Machine Translation of WO-2017200206-A1 (Year: 2017).*

*Primary Examiner* — Laura E. Parker
(74) *Attorney, Agent, or Firm* — Laurence A. Greenberg; Werner H. Stemer; Ralph E. Locher

(57) ABSTRACT

A pressure tank for storing gas, for mounting in a gas-operated vehicle. The pressure tank has a rotationally symmetrical, elongate shape which is cylindrical in the central region and is closed at both ends by curved polar caps, and a wall which surrounds a hollow space for storing the gas. At each of the polar caps, the pressure tank has a metallic connection piece, a so-called boss. The wall has a reinforcing layer made from fiber-reinforced plastic and an inner liner for sealing purposes. For sealing purposes, a bush is connected to the boss. A pressure ring and a spring element are configured in such a way that the spring element is supported on the bush and presses the pressure ring against the liner and, as a result, presses the liner in a region against the boss.

19 Claims, 8 Drawing Sheets

(52) U.S. Cl.
CPC ................. *F17C 2203/0673* (2013.01); *F17C 2205/0305* (2013.01); *F17C 2209/22* (2013.01); *F17C 2270/0168* (2013.01)

(58) Field of Classification Search
CPC .......... F17C 2205/0305; F17C 2209/22; F17C 2270/0168; F17C 2201/058; F17C 2205/0302
USPC .......................................................... 220/581
See application file for complete search history.

(56) References Cited

U.S. PATENT DOCUMENTS

| | | | | |
|---|---|---|---|---|
| 8,899,439 | B2 | 12/2014 | Zieger | |
| 10,274,132 | B2 | 4/2019 | Chung et al. | |
| 2011/0220659 | A1 * | 9/2011 | Strack | F17C 1/16 220/586 |
| 2014/0144866 | A1 * | 5/2014 | Heo | F17C 1/06 215/45 |
| 2018/0003341 | A1 * | 1/2018 | Hwang | F17C 13/04 |
| 2020/0332957 | A1 * | 10/2020 | Moutray | F17C 1/00 |
| 2021/0123565 | A1 * | 4/2021 | Kerforn | F17C 1/00 |

FOREIGN PATENT DOCUMENTS

| | | | | |
|---|---|---|---|---|
| DE | 102016219638 | A1 | 6/2017 | |
| EP | 0203631 | A1 | 12/1986 | |
| WO | 2009129530 | A1 | 10/2009 | |
| WO | WO-2017200206 | A1 * | 11/2017 | F17C 1/02 |

* cited by examiner

PRESSURE TANK FOR GAS-OPERATED VEHICLE

FIELD AND BACKGROUND OF THE INVENTION

The invention relates to a pressure tank for storing gas for assembly in a gas-operated vehicle, wherein the pressure tank has a rotationally symmetrical elongate form which is cylindrical in the central region and which is closed at both ends with curved pole caps. The pressure tank has a wall which surrounds a hollow space for storing the gas and a metal connection piece, a so-called boss, on each of the pole caps, wherein the wall comprises a reinforcement layer made of fiber-reinforced plastics material and an inner liner for sealing.

The invention further relates to a method for producing such a pressure tank or a pre-product for such a pressure tank, wherein for the structure of the wall of the pressure tank a liner which surrounds the hollow space for storing the gas is produced in a blow-molding method.

Gas-operated vehicles have, for example, a gas motor or a fuel cell with an electric motor as a drive. In order to be able to store sufficient fuel, the gas which may inter alia be hydrogen is stored under high pressure in the tank. Typical for such pressure tanks are pressures of over 200 bar, often up to 600 bar and sometimes even up to 700 or 800 bar. This means that not only must the pressure tank be gas-tight under this pressure, but also that it requires a high level of mechanical stability.

In the prior art, pressure tanks for gas-operated vehicles are known. These pressure tanks have a wall which for sealing comprises an inner liner, for example, made of thermoplastic material, and in order to provide the mechanical stability comprises a reinforcement layer made of fiber-reinforced plastics material. Preferably, the reinforcement layer is wound and configured as a CFRP layer. CFRP stands for carbon-fiber-reinforced plastics material.

The boss has a through-hole and a connection thread. In at least one of the two bosses, a tank fitting which enables the pressure tank to be filled or gas to be removed in a controlled manner is connected. On the other boss, the through-opening is sealed with a closure or another tank fitting or a safety valve is provided at that location.

Particular attention must be paid with such pressure tanks to the connection between the metal connection piece, the boss, and the liner since in this instance particularly good sealing is required, including under mechanical loading, with changing internal pressure or with significant temperature fluctuations. In particular with hydrogen tanks, this is a significant challenge.

DE 10 2014009343A1 describes a pressure tank which has the above-mentioned features. In order to improve the sealing, a clamping sleeve is provided at that location between the reinforcement layer and liner. The clamping sleeve should transmit external loads acting via the boss to the reinforcement layer and thus protect the liner from overloading which can lead to leakage.

DE 102010021667 A1 provides a sealing ring between the boss and liner which is intended to ensure the sealing. In DE 102016219638 A1 a sealing ring is pressed by means of a locking sleeve into a gap between the boss and liner in order to achieve a sealing between the liner and boss.

However, the configurations according to the prior art have the disadvantage that they do not act sufficiently well against changing loads, whether it be as a result of temperature fluctuations or as a result of changing pressure loads, and thus also do not ensure any durable sealing.

A good and lasting sealing is, however, particularly important with larger pressure tanks particularly for hydrogen, as required, for example, for utility vehicles which are driven with a fuel cell. Such pressure tanks may reach diameters of up to 600 mm and lengths of 2500 mm. Previously known sealing concepts are not sufficient in this instance.

SUMMARY OF THE INVENTION

The object of the invention is to develop a pressure tank which has better sealing and a long service-life with a low level of leakage and to set out a method in which such pressure tanks can be produced in a simple and reliable manner.

The object is achieved, on the one hand, by a pressure tank as claimed. Advantageous features are set out in the respective dependent claims.

According to the invention, the pressure tank as claimed is characterized in that for sealing a bush which is connected to the boss, a pressure ring and a resilient element are provided and configured in such a manner that the resilient element is supported on the bush and presses the pressure ring onto the liner and thereby presses the liner in a region onto the boss. This region is a face and is preferably in the form of an annular face.

A significant advantage of the embodiment according to the invention involves, as a result of the resilient element and as a result of the two-part configuration with a bush and a pressure ring, a pretensioning being able to be applied to the sealing face between the liner and boss for sealing. The sealing face is located in the region in which the liner is pressed onto the boss. As a result of the pretensioning which is produced in this manner, for example, also in the event of a low internal pressure or expansions as a result of temperature differences, an adequate sealing is always provided. As a result of an adapted adjustment of the resilient force, an over pressing of the liner and consequently a deformation which leads to leakage can further be prevented.

A resilient element is intended to be understood in this instance to be an element which in the event of compression can apply adequate flexible resilient force. For example, it may be in the form of an annular element which is made of spring steel and which has so-called resilient flanks, in particular the resilient element may have a U-shaped or V-shaped cross section. Alternatively, the resilient element may also be formed from a plurality of leaf springs or helical springs which are arranged between the bush and pressure ring. Other types and shapes of springs can also be used in this instance. In particular, the resilient element may be in the form of a so-called cup spring. The cup spring may have one or more spring plates. The spring strength can be adjusted inter alia by means of the number of spring plates which are arranged one behind the other.

For example, resilient polymers (elastomer materials or cross-linked thermoplastic materials) or resilient elements made of fiber composite plastics materials can be used as additional resilient materials.

In a particularly advantageous manner, the resilient element is configured in such a manner that it has a direction in which the resilient force for pressing acts and which forms with the longitudinal axis L of the pressure tank an angle of a maximum of +/−20° and which is orientated in particular substantially parallel with the longitudinal axis L. Such an orientation affords the possibility of being able to adjust and change the resilient pretensioning from the outer side via the central hole of the boss. In addition, it affords advantages during the assembly.

In another preferred embodiment, the pressure ring touches the liner with a face which forms an angle with respect to the longitudinal axis L between 70° and 110° and which is orientated in particular substantially perpendicularly to the longitudinal axis L. This is also advantageous for the assembly and adjustability.

Preferably, the bush is arranged in such a manner that it has no planar contact with the liner. The pressing for sealing is now transmitted via the surface of the pressure ring.

In order to permanently ensure the function, it is advantageous for the pressure ring together with the bush to completely surround the resilient element. The resilient element is thus protected and remains in the desired position. In addition, this embodiment also provides a simpler assembly. These advantages also already have a positive effect inter alia during the production of the liner in the blow-molding method. The term "completely surround" in this context is also intended to be understood to include the case when individual openings or gaps are still present. It does not have to be completely encapsulated.

In addition, the pressure ring is preferably configured in terms of the contour thereof which faces the resilient element in such a manner that the resilient element abuts in a positive-locking manner against the contour. A large contact face between the resilient element and pressure ring which ensures a uniform force transmission to the sealing face is thus used.

In a preferred variant, the bush is secured to the boss by means of a screw thread, in particular in such a manner that the force with which the pressure ring is pressed can thereby be changed. Thus, the bush may, for example, have an outer thread which engages in an inner thread on the boss. As a result of the differing depth of screwing of the bush into the boss, the spring between the bush and pressure ring can be compressed to a differing degree. The pretensioning can thus be adjusted in a selective manner.

Alternatively, the bush may be secured to the boss by means of a clamping. The clamping must in this instance be carried out in such a manner that it cannot be released by the resilient force.

Furthermore, the bush may have a collar on which the resilient element is supported, wherein the collar is arranged substantially perpendicularly to the longitudinal axis L of the pressure tank. A good capacity for assembly and a good force transmission are thus achieved.

In one advantageous embodiment, the boss has an outer thread which is in contact with the liner. A good mechanical connection between the liner and boss which affords a good stability when the reinforcement layer is produced is thus produced. The reinforcement layer is in most cases produced in a winding method in which high radial forces occur.

In order to produce an adequate sealing face between the liner and boss, it is advantageous for the face, which is pressed onto the liner, of the pressure ring to extend in a radial direction R at least 20 mm, preferably at least 30 mm. As an upper limit, an extent of a maximum of 100 mm is advantageous in order not to require excessive structural space.

The sealing of the pressure tank can be further improved when the boss has projections which are located on the face of the boss onto which the liner is pressed by the pressure ring. This region of the boss is also referred to as a sealing face. The projections are preferably in the form of concentric rings around the longitudinal axis L. When the pressure ring is pressed onto the liner by the resilient element, the projections on the boss are pressed into the liner at the side opposite the pressure ring. The sealing between the liner and boss is thereby significantly increased. This improvement is particularly evident with low internal pressure in the pressure tank. The pressure tank can thus be emptied up to a lower pressure level without any fear of leakages.

The projections are only a few tenths of a millimeter high, preferably between 0.3 and 1.5 mm, in a particularly preferred manner between 0.5 and 1 mm high so that, although they press to some extent into the liner, they do not damage it or even produce cracks. The projections may, for example, have a semi-circular or a triangular or a similar cross section.

The sealing may also be further improved by the boss having a groove in which a sealing ring is provided, wherein the groove is arranged in such a manner that the sealing ring comes into contact with the liner. In addition, the groove is located in the region of the boss in which the liner is pressed onto the boss by the pressure ring. The liner is thus also pressed onto the sealing ring by the pressure ring. The sealing ring can consequently compensate for relatively small position changes of the liner without the sealing being reduced. In addition to the sealing ring, a support ring can preferably be used. As a result of the internal container pressure and the resilient pretensioning, the liner conforms to the support ring and ensures that no gap can be produced between these two members. The sealing ring thereby cannot be pressed into a gap between the liner and boss.

So that the pretensioning is effectively built up and a good sealing is achieved, the pressure ring can be displaced relative to the bush in the direction of the longitudinal axis L. The pressure ring can thus be configured in such a rigid manner that a uniform pressing over the face and consequently a reliable sealing are achieved.

The configuration is further improved when the pressure ring has a stop and/or the bush has a stop which are configured in such a manner that a rigid force transmission between the pressure ring and bush is possible in the direction of the longitudinal axis L via the completely compressed resilient element. The term "completely compressed" is in this instance intended to be understood to mean that the resilient element is pressed together to such an extent that a rigid force transmission is carried out via the resilient element and not a resilient force transmission which is dependent on the resilient force.

In order thus to produce a greater pressing force between the liner and boss than the resilient element can apply, the screw connection between the boss and bush can be tightened in such a manner that the force is transmitted via the stop(s) from the bush to the pressure ring.

Particularly when projections which are intended to press into the liner are provided on the boss, this affords advantages. During the assembly of the boss on the bush, a very much higher pressing force can thus be produced, whereby the projections are effectively pressed into the liner. For example, as a result of the screw connection, a pressing force of up to 40 kN can be applied, whilst the cup spring which is used as a resilient element has, for example, only 5 kN restoring force. Later during operation of the pressure tank, an excessively high pressing force would be harmful since the liner material would flow and be pressed out of the region of the pressure face. Therefore, the resilient force cannot be selected to be so high. A flowing of the liner material which initially occurs after the assembly ensures that a small gap is produced between the stop(s) and the respective counter-face and consequently the pressing force during operation is reduced to the value of the resilient force.

This value is configured in such a manner that the liner can permanently withstand it. As a result of the increased pressing force acting during the assembly, the projections on the boss are pressed effectively into the liner and ensure improved sealing.

Furthermore, a rigid force transmission between the bush and pressure ring may also be advantageous during the blow-molding in order to retain the components in the desired position.

On the other hand, the object is also achieved by a method for producing an above-described pressure tank according to the invention or a pre-product for such a pressure tank as claimed. Other advantageous features are set out in the respective dependent method claims.

The method is characterized in that a bush which can be connected to a boss, a pressure ring and a resilient element are arranged on a so-called blow pin, whilst the liner is produced with the blow-molding method in such a manner that the pressure ring and the resilient element are located after production of the liner on the inner side of the liner, wherein the resilient element can be supported on the bush and can press the pressure ring onto the liner and can press the liner onto a face of a boss when the bush is connected to a boss.

During the blow-molding method, the plastics material for the liner is extruded from a nozzle so that a hose is initially produced. Two or more portions of the blow-molding tool are then brought together so that a cavity is formed for the pressure tank in the form of the liner which is intended to be formed. The extruded hose is located in this cavity. Via the so-called blow pin, a mouthpiece, gas is blown into the hose, whereby it is applied against the inner side of the blow-molding tool. The liner thus takes on the desired shape. After the plastics material has solidified, the liner can be taken out of the mold. The blow pin is removed. Preferably, the liner is produced from a thermoplastic plastics material, for example, from polyamide. Thermoplastic plastics material solidifies after cooling.

By implementing the method according to the invention, the bush, pressure ring and resilient element are already introduced inside the liner during the production of the liner at the desired location in such a manner that they can be subsequently connected to a boss and can perform the function according to the invention for improved sealing. The pressure ring and the resilient element are located after the production of the liner on the inner side of the liner, wherein the resilient element can be supported on the bush and can press the pressure ring onto the liner and can press this liner onto a face of a boss when the bush is connected to a boss.

Particularly relatively large pressure tanks have on both pole caps a boss. In a particularly preferred manner, a bush, a pressure ring and a resilient element are therefore provided in the manner described above in each case on both pole caps of the pressure tank in order to improve the sealing between the liner and the respective boss.

In the method according to the invention, a second bush, a second pressure ring and a second resilient element may be arranged in this manner on a retention member or on the blow-molding tool, whilst the liner is produced in the blow-molding method in such a manner that the second pressure ring and the second resilient element after the production of the liner are also located on the inner side of the liner, wherein the second resilient element can be supported on the second bush and can press the second pressure ring onto the liner and can press this liner onto a face of a second boss when the second bush is connected to a second boss.

In order to produce a stable connection between the boss and liner, the respective boss preferably has an outer thread which engages in a corresponding inner thread in the liner. The inner thread in the liner is preferably produced after demolding from the blow-molding tool in a machining manner, for example, by means of milling. The boss is thereby prevented from having to cut into the surface when being screwed into the liner, with the liner thus becoming damaged. A stable connection is thus achieved between the boss and liner and also withstands the high loading when the reinforcement layer is produced, in particular during winding. In addition, with such a thread, a positionally precise screwing which can be repeated with accuracy is produced on the liner so that both components are always positioned identically with respect to each other.

Furthermore, it is advantageous for one boss to be provided with a left-hand thread and the second boss to be provided with a right-hand thread as an outer thread, wherein the liner has correspondingly fitting threads at each of the sides. Both boss/liner connections can thus absorb higher rotation forces in a common rotation direction and are thus better protected against unscrewing during the subsequent winding operation.

Furthermore, during the blow-molding the pressure ring may be displaced so far in the direction of the longitudinal axis L relative to the bush that it completely compresses the resilient element so that a rigid force transmission between the bush and the pressure ring via the resilient element, and in particular via a stop on the pressure ring and/or a stop on the bush, is possible.

In another method step, a boss is connected to the liner and to the bush, wherein the connection between the boss and the bush is carried out by screwing the boss onto an outer thread of the bush. In this instance, the boss is screwed so far onto the bush that the pressure ring is displaced in the direction of the longitudinal axis L relative to the bush and it compresses the resilient element completely until a rigid force transmission between the bush and the pressure ring is possible via the resilient element and particularly via a stop on the pressure ring and/or a stop on the bush. The advantages of this procedure during assembly of the boss have already been described above.

In yet another method step, tapes made of fiber-reinforced plastics material, in particular made of CFRP (carbon-fiber-reinforced plastics material) are wound around the pre-product which has been produced from the liner and boss in order to form the reinforcement layer of the pressure tank. The tapes are preferably already impregnated with a suitable plastics material resin (so-called Towpreg) which is hardened after the winding.

BRIEF DESCRIPTION OF THE FIGURES

With reference to embodiments, other advantageous features of the invention will be explained with reference to the drawings. The features mentioned can advantageously be implemented not only in the combination set out, but also combined individually with each other. The Figures show in detail.

DETAILED DESCRIPTION OF THE INVENTION

Figure 1:
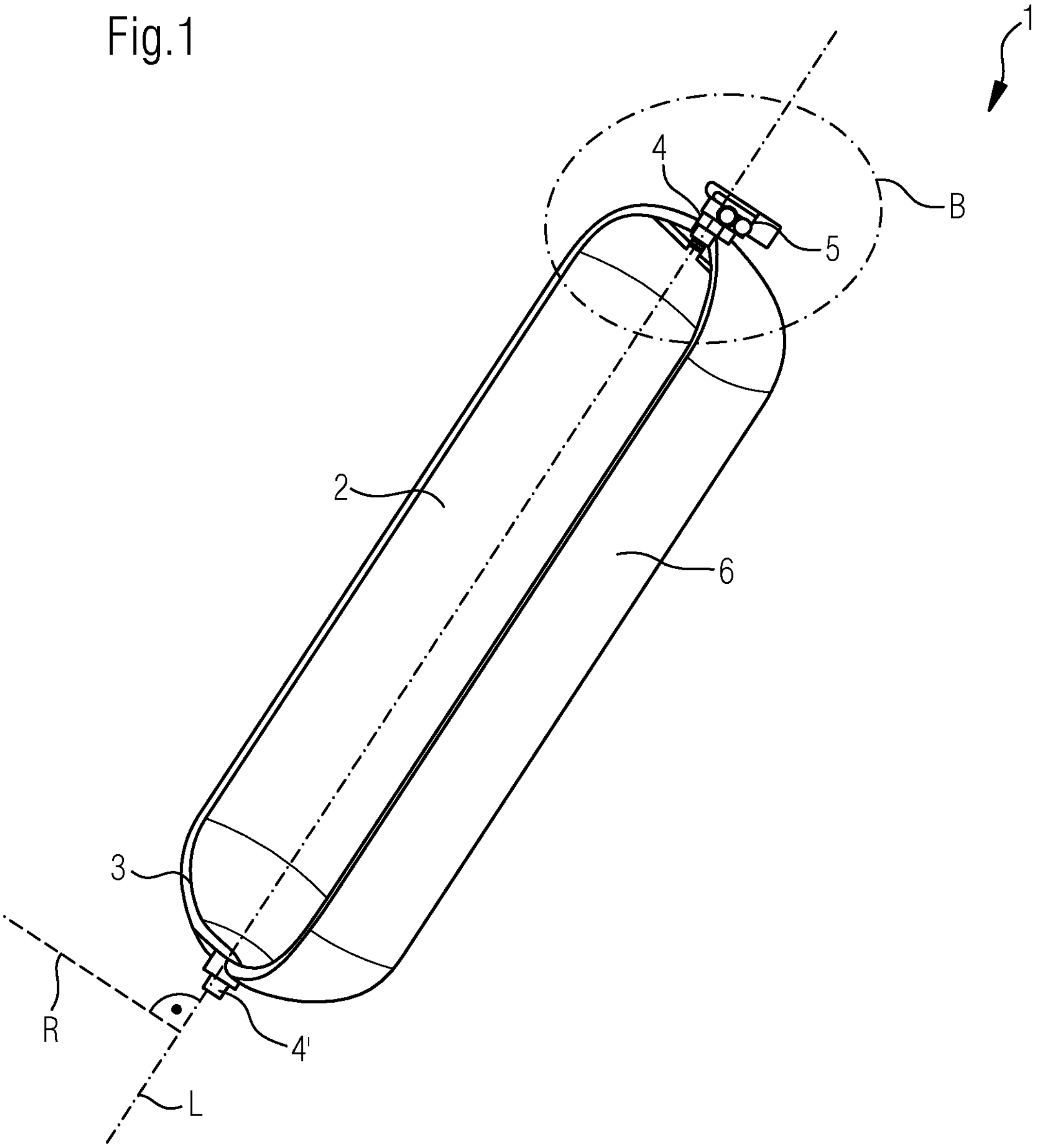
FIG. 1 shows a schematic illustration of a pressure tank according to the invention.

The Figures are described in greater detail below. Reference numerals which are the same refer to identical or similar structural parts or components.

FIG. 1 shows the pressure tank 1 with a boss 4, 4' on each of the two pole caps. A tank fitting 5 for introducing and for controlled removal of gas is screwed into the boss 4. The boss 4' is sealed with a closure. Alternatively, it may receive a safety valve. The wall of the pressure tank 1 surrounds the hollow space 2 and is formed by an internal liner 3 and a reinforcement layer 6. The liner 3 is preferably produced from thermoplastic plastics material, such as, for example, polyamide, and is produced in methods according to the invention with a blow-molding method. The reinforcement layer 6 is produced using a winding method with tapes made of fiber-reinforced plastics material, preferably from CFRP. The pressure tank 1 is rotationally symmetrical about the longitudinal axis L. Particular attention must be paid in such pressure tanks to the sealing between the boss 4, 4' and liner 3. In particular with large pressure tanks, as required in utility vehicles in order to enable an adequate range, the good sealing presents a difficult challenge.

Figure 2A:
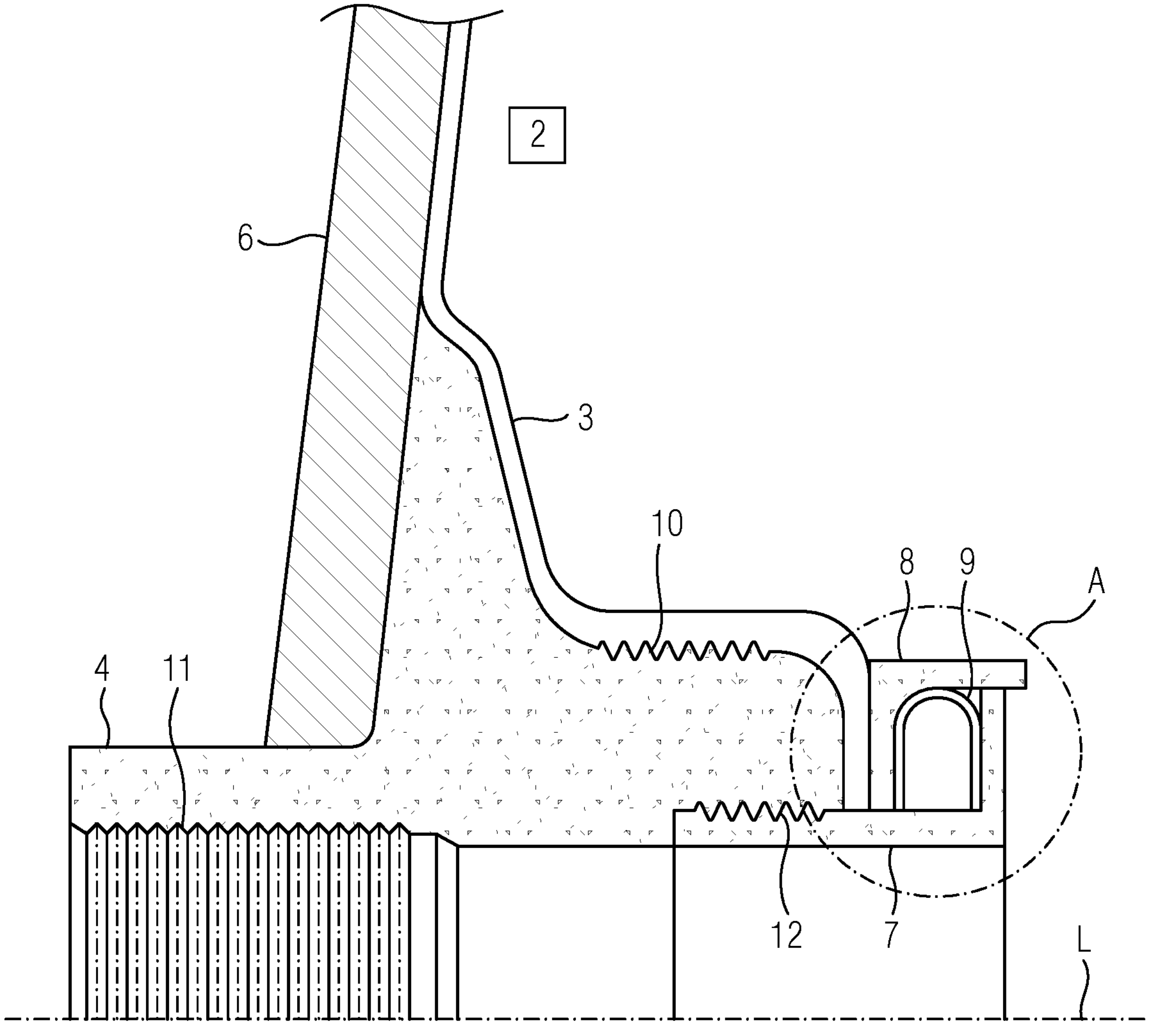
FIG. 2*a* shows a detailed cut-out of the connection between the boss and wall with an embodiment according to the invention.
Figure 2B:
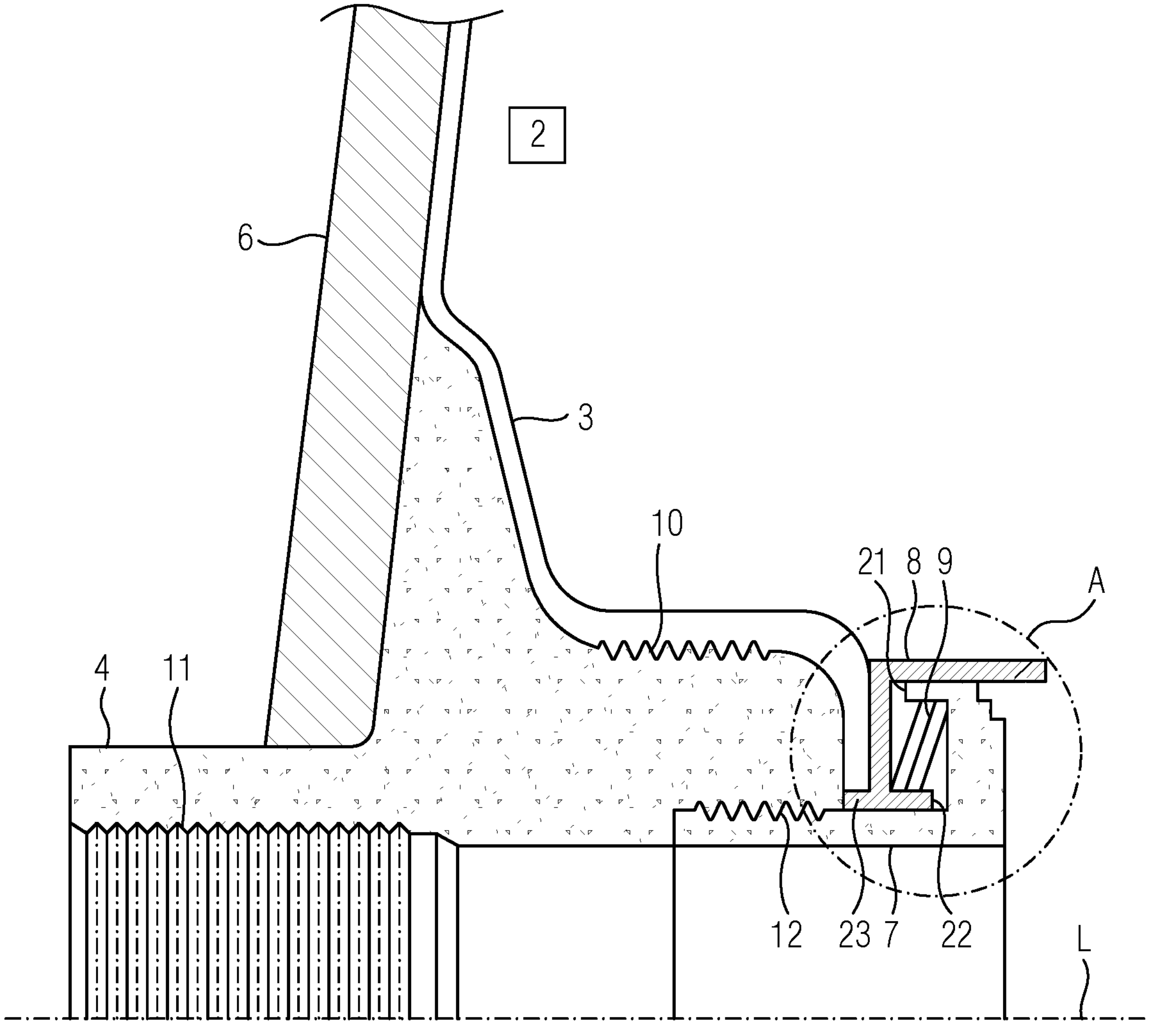
FIG. 2*b* shows a detailed cut-out of the connection between the boss and wall in another embodiment according to the invention, FIGS. 3*a, b, c* show a cut-out with an illustration of different embodiments according to the invention for sealing between the boss and liner.

FIGS. 2*a* and 2*b* show the cut-out B of the pressure tank 1 as an enlarged view so that the embodiment according to the invention for improved sealing can be seen. Two different embodiments are illustrated.

The pressure ring 8 and the resilient element 9 are located inside the liner 3, that is to say, in the hollow space 2. Via the bush 7 which is connected to the boss 4, the resilient element 9 is pretensioned and presses the pressure ring 8 onto the liner 3 and consequently presses the liner 3 onto the boss 4. The connection between the boss 4 and the bush 7 is produced by means of the screw connection 12, wherein a corresponding outer thread is located on the bush 7. The pressing of the liner 3 on the boss is carried out only via the pressure ring 8. This pressure ring 8 can be moved with respect to the bush 7 and can be displaced in the direction of the longitudinal axis L. Together, they surround the resilient element 9 which is thereby well protected. In addition, the components can thereby be readily assembled. To this end, a special tool is used which can be introduced through the central hole of the boss 4. In the embodiment in FIG. 2*a*, the resilient element 9 is in the form of a resilient ring with a U-shaped cross section. The pressure ring 8 is at the side which the resilient element 9 abuts, preferably shaped in such a manner that the largest possible contact face is used for force transmission. In this instance, the pressure ring 8 has a bent shape which corresponds to the curve of the resilient ring with a U-shaped cross section.

In the embodiment according to FIG. 2*b*, the pressure ring 8 has at the side facing the liner 3 a collar 23. The resilient element 9 is in this embodiment in the form of a cup spring. A cup spring is shown having two spring plates, but only one spring plate or a plurality of spring plates may also be provided. Using the strength, the material and the number, the resilient force can be adjusted to the desired extent. The pressure ring 8 is at the side which the resilient element 9 abuts, preferably shaped in such a manner that a good force transmission is possible. In addition, the pressure ring 8 has a stop 22 which, when the resilient element 9 is sufficiently compressed, abuts the bush 7. The bush 7 also has a stop 21 which, when the resilient element 7 is sufficiently compressed, abuts the pressure ring 8. A rigid force transmission between the pressure ring 8 and bush 7 can thus be produced, as is advantageous for the assembly of the boss or during the blow-molding of the liner.

For the embodiment according to the invention, resilient elements other than those shown here in the example can also be used.

The face of the pressure ring 8 which is pressed onto the liner 3 and the face of the liner 3 which is pressed onto the boss 4 are orientated substantially perpendicularly to the longitudinal axis L. The collar of the bush 7 on which the resilient element 9 is supported is also arranged substantially perpendicularly to the longitudinal axis L. As a result of screwing 12, the resilient force of the resilient element 9 is completely transmitted via the pressure ring 8 onto the sealing face between the boss 4 and the liner 3. As a result of an oblique positioning of these faces of a maximum of +/−20°, an adequate force transmission can still be achieved. The oblique positioning of the sealing face further contributes to better ventilation of the sealing collar during the liner production. As a result of the oblique positioning, when the tool halves are moved together, the air can escape better from the pinch location.

The region of the boss 4 in which the pressure ring 8 presses the liner 3 onto the boss 4 is referred to as a sealing face or throttle location. The sealing and consequently the throttling of the gas inner pressure in the pressure tank is carried out by pressing the liner 3 onto the boss 4 as a result of the resilient force of the resilient element 9 and as a result of the internal gas pressure itself.

The liner 3 is secured to the boss 4 by means of a thread 10. On the boss there is an outer thread 10 and on the liner an inner thread 10. The inner thread 10 on the liner is accordingly processed in a cutting manner in an appropriate manner.

Furthermore, on the boss 4 there is provided the inner thread 11 via which a tank fitting, a safety valve or a closure can be screwed.

Figure 3A:
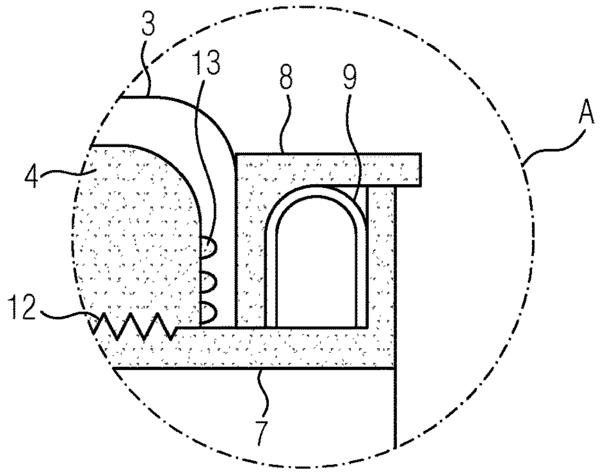
FIG. 3*d* shows a cut-out with an illustration of another embodiment according to the invention for sealing between the boss and liner during operation of the pressure tank.
FIG. 3*e* shows a cut-out with an illustration of another embodiment according to the invention for sealing between the boss and liner during assembly of the boss.
Figure 3B:
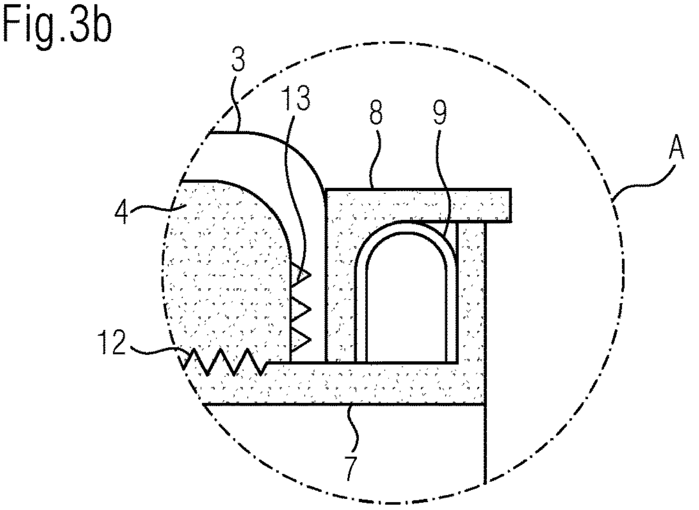

The cut-out A is shown in the following FIGS. 3*a-c*. These Figures show other embodiments setting out how the boss 4 can be advantageously configured in the region in which the liner 3 is pressed onto the boss by the pressure ring 8.

In this region, the boss 4 has projections 13 instead of a smooth surface (FIGS. 3*a* and 3*b*). the projections 13 are in this instance in the form of concentric rings on the face and only a few tenths of a millimeter, preferably between 0.3 and 1.5 mm, in a particularly preferred manner between 0.5 and 1 mm high. The projections 13 press into the surface of the liner 13 and improve the sealing action. On the one hand, they are configured with a rounded or semi-circular cross section and, on the other hand, with a triangular cross section. Other forms are also possible.

Figure 3C:
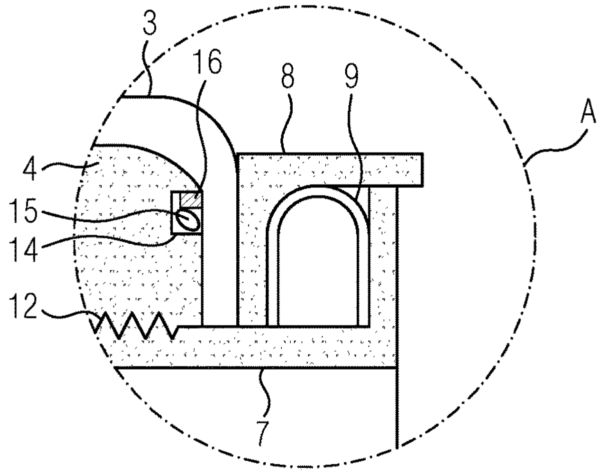

FIG. 3*c* shows another variant for improving the sealing. This can also be used in combination with the projections. In this instance, the sealing ring 15, for example, an O-ring, is placed in a groove 14 on the boss. The groove 14 is preferably located in the region of the boss 4 onto which the liner 3 is pressed by the pressure ring 8. However, the groove may also be provided outside this region. So that the sealing ring 15 is not pressed into the gap between the boss 4 and liner 3 in the event of relatively significant loads, the support ring 16 may be provided. The gas inner pressure in the pressure tank and the pressing by the resilient element 9 ensure that the liner 3 abuts in a uniform and effectively sealing manner against the support ring 16.

Figure 3D:
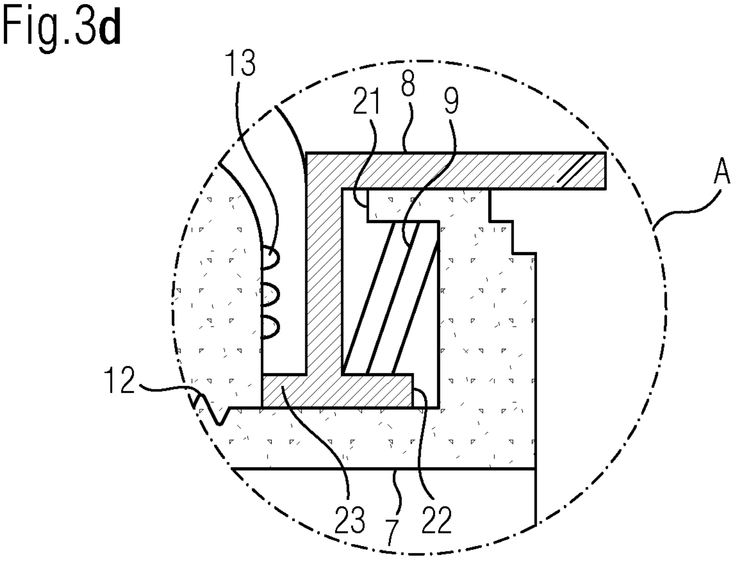

For the cut-out A, in the following FIGS. 3*d* and 3*e*, another variant is shown. These Figures show in FIG. 3*d* how the arrangement appears during operation of the pressure tank and, in FIG. 3*e*, how it appears after assembly of the boss which is carried out after the production of the liner in a blow-molding operation.

The enlargement shows the projections 13 which are not illustrated in FIG. 2 for the sake of clarity. The projections 13 are provided on the face of the boss 4 on which the liner 3 is pressed by the pressure ring 8. The projections 13 are not true to scale since they would otherwise not be able to be seen. The projections 13 are in this instance in the form of concentric rings on the face and only a few tenths of a millimeter, preferably between 0.3 and 1.5 mm, in a particularly preferred manner between 0.5 and 1 mm high. The projections 13 press into the surface of the liner 13 and improve the sealing action. They may, for example, be configured with a rounded or semi-circular or triangular cross section. Other forms are also possible. In the operating state, as illustrated in FIG. 3*a*, a gap is provided in each case between the stops 21, 22 and the respective counter-faces on the pressure ring or on the bush. The pressing of the pressure ring 8 on the liner 3 and consequently on the boss 4 corresponds to the resilient force of the resilient element 9, for example, in the order of magnitude of 5 kN. Depending on the filling pressure and temperature, the gap width may change slightly.

Figure 3E:
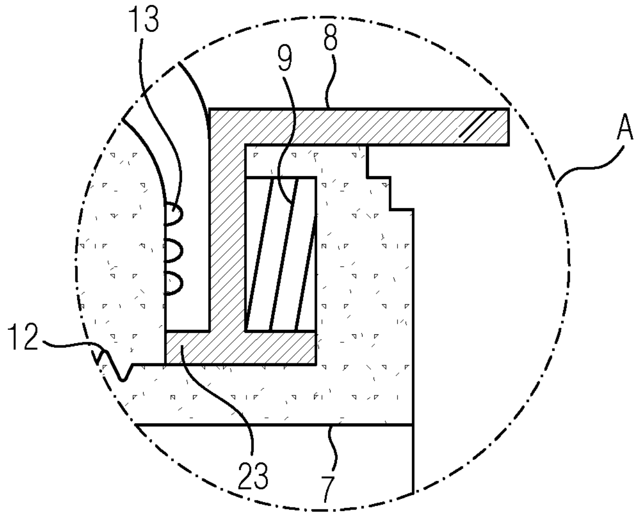

In FIG. 3*e*, there is no gap between the stops 21, 22 and the respective counter-faces. The boss 4 is screwed so far onto the bush 7 or the bush 7 is screwed so far into the boss 4 that the stops 21, 22 come into contact and the pressing force can be increased via the screw connection. It is possible, for example, for a pressing force of up to 40 kN to be applied in order to press the projections 13 effectively into the liner 3 during the assembly. Under this high pressure and during the subsequent pressure test, the liner material will flow slightly and the liner 3 is pressed out of the pressing region between the boss 4 and pressure ring 8 and the liner 3 becomes slightly thinner in this region. This is carried out until the stops 21, 22 form a gap with respect to the respective counter-face thereof and the pressing thereby decreases to the level of the resilient force of the resilient element 9. Consequently, the state as shown in FIG. 3*a* is achieved.

Another variant for improving the sealing is not illustrated. This can also be used in combination with the projections. In this instance, a sealing ring, for example, an O-ring, is placed in a groove on the boss. The groove is preferably located in the region of the boss 4, on which the liner 3 is pressed by the pressure ring 8. However, the groove may also be provided outside this region. So that the sealing ring is not pressed into the gap between the boss 4 and liner 3 in the event of relatively significant loads, a support ring may be provided. The internal gas pressure in the pressure tank and the pressing by the resilient element 9 ensure that the liner 3 is placed in a uniform and effectively sealing manner against the support ring.

Figure 4A:
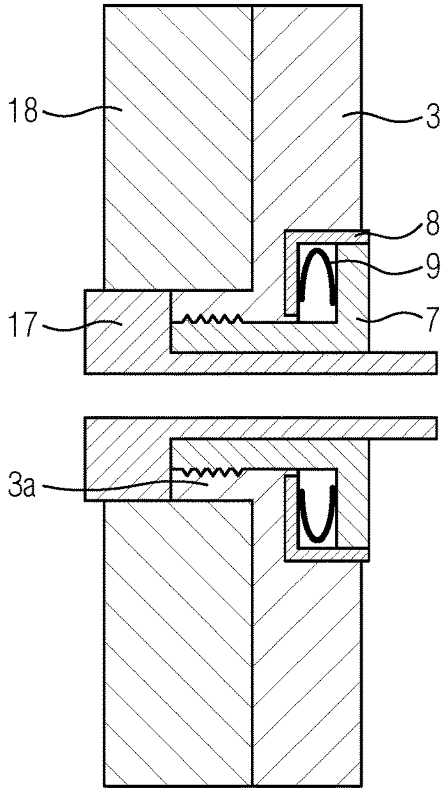
FIG. 4*a* shows a cut-out of an arrangement for producing a pressure tank according to the invention or a pre-product therefor.
Figure 4B:
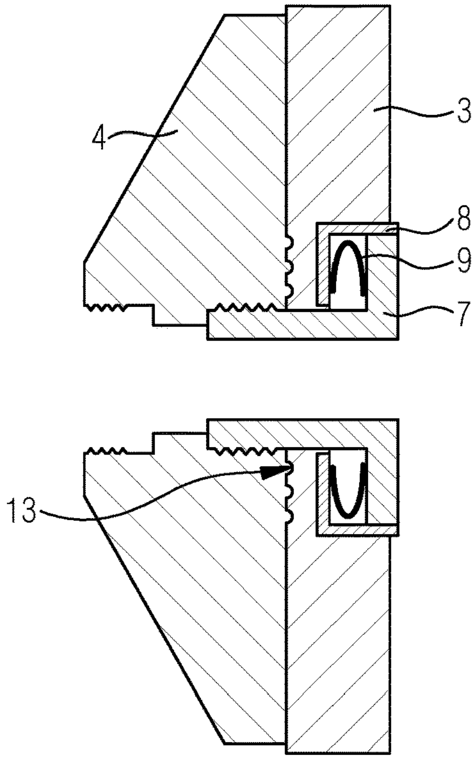
FIG. 4*b* shows a cut-out of a pre-product for producing a pressure tank according to the invention after assembly of the boss.

In order to illustrate the method according to the invention for producing a pressure tank, FIGS. 4*a* and 4*b* also show a cut-out. FIG. 4*a* shows an arrangement as used during the production of the liner. The bush 7 with the pressure ring 8 and the resilient element 9 is mounted on the blow pin 17. The two-piece or multi-piece blow-molding tool 18 when closed presses the liner material onto the blow pin 17 and onto the bush 7 and the pressure ring 8. The liner material, preferably a thermoplastic plastics material, is extruded beforehand as a hose from a nozzle. If the blow-molding tool is closed, gas is blown in via the blow pin which acts as a mouthpiece so that the liner material is pressed into the blow-mold and the desired form of the liner 3 is produced. After solidification, the blow-molding tool is opened and the liner 3 is removed from the mold. The pressure ring 8 and the resilient element 9 are then located at the inner side of the liner 3 in the hollow space 2 and the bush 7 is arranged in such a manner that it can subsequently be connected to the boss 4. To this end, the portion 3*a* of the liner 3 is removed in order to expose the outer thread on the bush 7. In addition, the liner 3 can be further processed. For example, a thread can be cut or milled in the surface of the liner 3 for connection to an outer thread on the boss.

In order to also be able to secure a second boss to the opposing pole cap of the pressure tank with the embodiment according to the invention for sealing, during the production a second bush, a second pressure ring and a second resilient element may be introduced. To this end, the second bush, the second pressure ring and the second resilient element at the side opposite the blow pin 17 are moved into position on a retention member or on the blow-molding tool so that they are also arranged, in a similar manner to the components on the blow pin 17 during the production of the liner, at the inner side. At this side, a boss can then also accordingly be connected to the second bush.

Figure 6A:
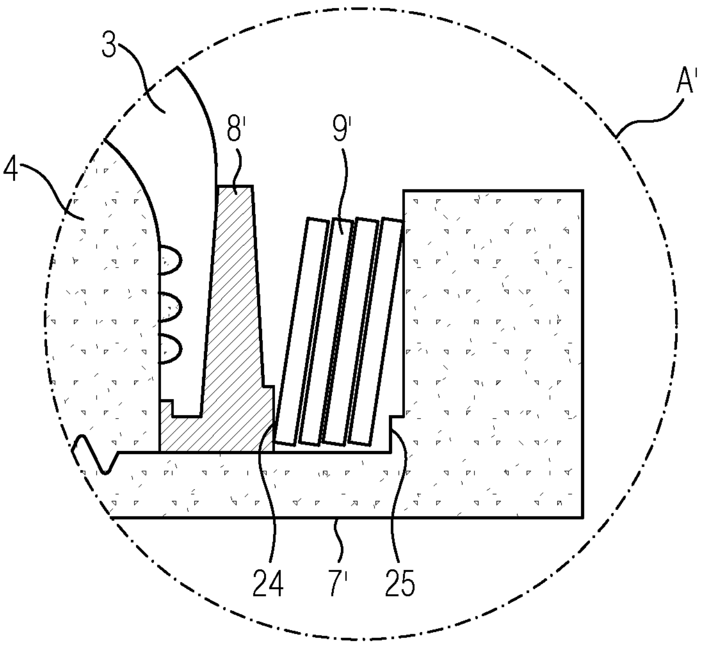
FIG. 6*a* shows a cut-out with an illustration of another embodiment according to the invention for sealing between the boss and liner during operation of the pressure tank.

Not illustrated, but also advantageous is the embodiment with the variants according to the invention according to FIG. 2*b* or FIG. 6*a/b*. During blow-molding in this instance, the pressure ring 8 can compress the resilient element 9; 9' to such an extent that the arrangement is fixed in a rigid manner and is retained during the blow-molding at the desired location. In the embodiment according to FIG. 2*b*, as a result of the compression of the resilient element 9, the stops 21 and 22 are in abutment against the respective counter-face on the pressure ring or the bush. In the embodiment according to FIG. 6*a/b*, the resilient element 9' is completely compressed so that the stops 24 and 25 produce a rigid force transmission via the resilient element 9'.

FIG. 4*b* shows the cut-out after the boss 4 has been screwed onto the bush 7. As a result of the screwing, the resilient element is compressed and presses the pressure ring 8 onto the liner 3 and the liner onto the boss 3. Via the screwing depth and via the resilient stiffness of the resilient element 9, the produced pretensioning can be adjusted.

The projections which are provided on the boss 4 in the region of the sealing face press into the surface of the liner 3 and thus increase the sealing. The projections are configured in this instance as concentric rings with a rounded cross section.

Also in this instance, the variants which are not illustrated according to FIG. 2*b* or FIG. 6*a/b* afford advantages. As already described above, in these variants the resilient elements 9, 9' can be compressed to such an extent that the bush 7 and the pressure ring 8 enable a rigid force transmission regardless of the resilience of the resilient element.

The liner 3 which has been shaped with the two bosses 4 screwed on is the pre-product for further production of the pressure tank. In another method step, tapes made of fiber-reinforced plastics material are wound around this pre-product in order to form the reinforcement layer of the wall. After the winding, the fiber-reinforced plastics material is hardened. Preferably, CFRP tapes which are impregnated with a suitable resin are used for this purpose.

Figure 5:
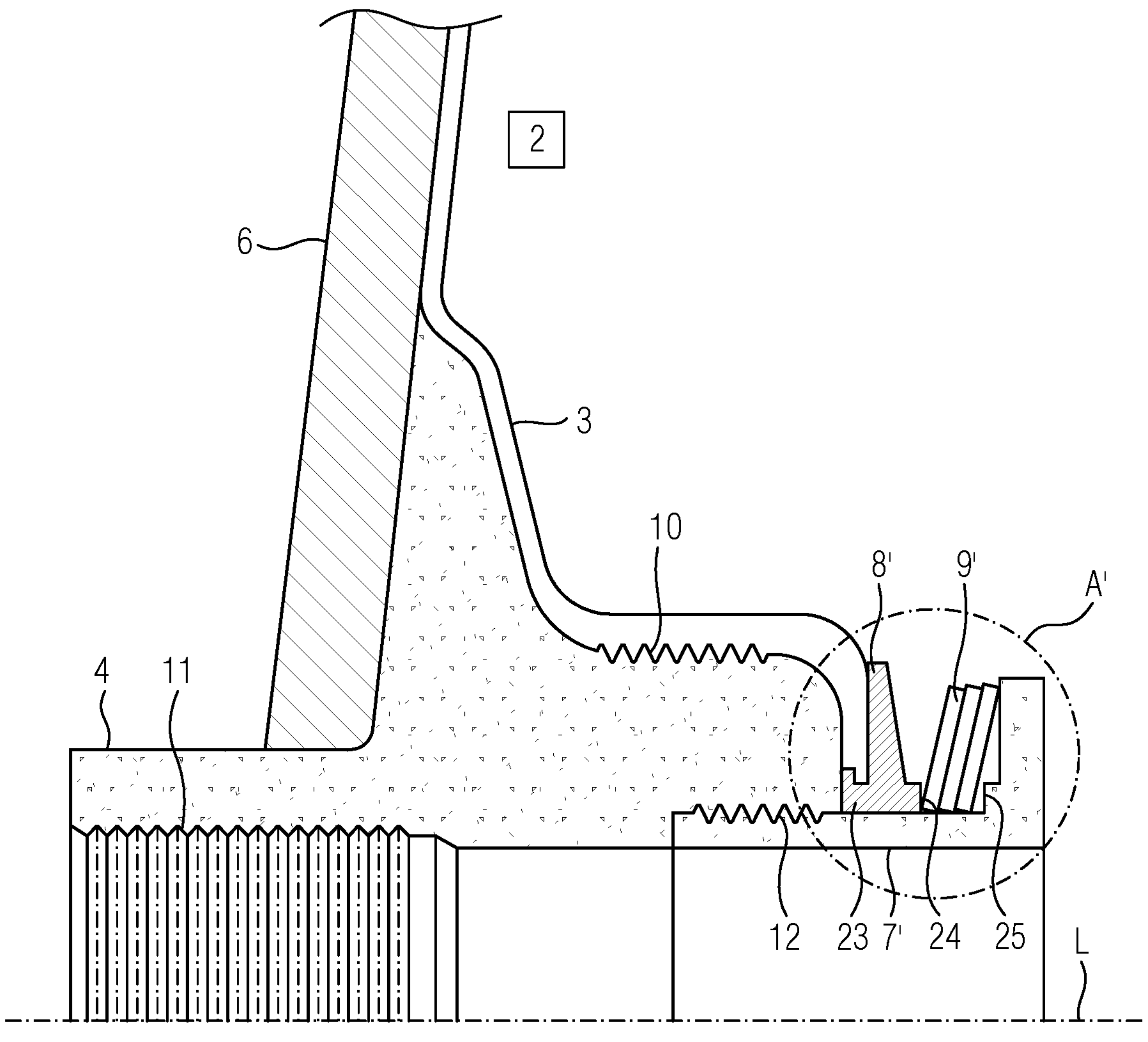
FIG. 5 shows a detailed cut-out of the connection between the boss and wall in another embodiment according to the invention.

FIG. 5 again shows the cut-out B of the pressure tank 1 as an enlarged view but for another embodiment according to the invention for improved sealing. The pressure ring 8' and the resilient element 9' are located inside the liner 3, that is to say, in the hollow space 2. Via the bush 7', which is connected to the boss 4, the resilient element 9' is pretensioned and presses the pressure ring 8' onto the liner 3 and consequently the liner 3 onto the boss 4. The connection between the boss 4 and the bush 7' is produced via the screw connection 12, wherein a corresponding outer thread is located on the bush 7'. The pressing of the liner 3 onto the boss is carried out only via the pressure ring 8'. This pressure ring 8' can be moved with respect to the bush 7' and can be displaced in the direction of the longitudinal axis L. The pressure ring 8' is guided on the bush 7' via the inner diameter thereof. The pressure ring 8' and the bush 7' can in this embodiment be configured in a very slim and space-saving manner.

The pressure ring 8 has a collar 23 at the side facing the liner 3.

The resilient element 9' is in this embodiment in the form of a cup spring. A cup spring having four spring plates is shown but only one spring plate or a plurality of spring plates may also be provided. Using the strength, the material and the number, the resilient force can be adjusted to the desired extent.

The face of the pressure ring 8' which is pressed onto the liner 3 and the face of the liner 3 which is pressed onto the boss 4 are orientated substantially perpendicularly to the longitudinal axis L. The collar of the bush 7', on which the resilient element 9' is supported, is also arranged substantially perpendicularly to the longitudinal axis L. As a result of the screw connection 12, the resilient force of the resilient element 9' is transmitted completely via the pressure ring 8 to the sealing face between the boss 4 and the liner 3. As a result of an oblique positioning of these faces of a maximum of +/−20°, an adequate force transmission can still be achieved. The oblique positioning of the sealing face additionally contributes to better ventilation of the sealing collar during the production of the liner. As a result of the oblique positioning, when the tool halves are moved together the air can escape better from the pinch location.

The region of the boss 4 in which the pressure ring 8' presses the liner 3 on the boss 4 is referred to as a sealing face or throttle location. The sealing and consequently the throttling of the internal gas pressure in the pressure tank is carried out by pressing the liner 3 onto the boss 4 as a result of the resilient force of the resilient element 9' and as a result of the internal gas pressure itself.

The pressure ring 8' at the side which the resilient element 9' abuts is preferably formed in such a manner that a good force transmission is possible. In particular, the stop 24 may be provided on the pressure ring which the resilient element 9' abuts.

For the embodiment according to the invention, resilient elements other than those shown in the example here can also be used.

The liner 3 is secured to the boss 4 by means of a thread 10. On the boss 4 there is an outer thread 10 and on the liner an inner thread 10. The inner thread 10 on the liner is accordingly processed in a cutting manner in an appropriate manner.

There is further provided on the boss 4 the inner thread 11 over which a tank fitting, a safety valve or a closure can be screwed.

The cut-out A' is shown in the following FIGS. 6*a* and 6*b*. These Figures show in FIG. 6*a* how the arrangement appears during operation of the pressure tank and in FIG. 6*b* how it appears after assembly of the boss 4 which is carried out after production of the liner in the blow-molding operation. Other details similarly apply as already mentioned above in the description of the Figures relating to the similar FIGS. 3*a* and 3*b*.

The significant difference in the variant shown here is that the bush 7' and particularly the pressure ring 8' are configured in a slimmer and more space-saving manner. That is a significant advantage in applications in which little structural space and the lowest possible weight are desired.

FIG. 6*a* shows that during operation the pressing between the pressure ring 8' and liner 3 is carried out via the resilient element 9' which is supported on the collar of the bush 7'. A gap is provided between the stop 25 on the bush and the resilient element 9'. The bush 7' is connected to the boss 4 by means of the outer thread 12 which is not completely illustrated. Depending on the number and selection of the spring plate for the resilient element 9' and depending on the spacing between the pressure ring 8' and bush 7', the pressing force on the face with respect to the liner 3 can be adjusted.

Figure 6B:
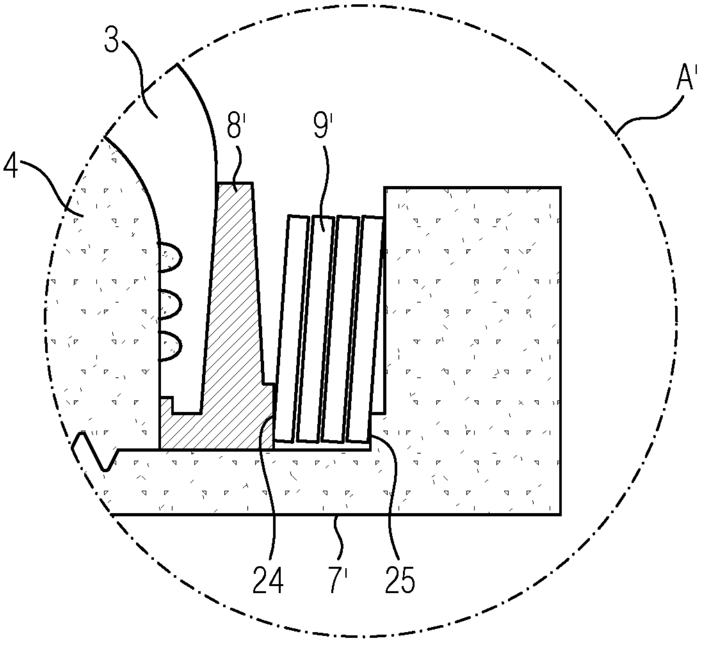
FIG. 6*b* shows a cut-out with an illustration of another embodiment according to the invention for sealing between the boss and liner during assembly of the boss.

In FIG. 6*b*, the resilient element 9' is completely compressed so that a rigid force transmission from the bush 7' to the pressure ring 8' is carried out. In the embodiment shown, this is produced by the stop 25 of the bush pressing via the resilient element 9' onto the stop 24 on the pressure ring 8'. In order to achieve this, the boss 4 is screwed so far onto the bush 7' or the bush 7' is screwed so far into the boss 4 that the stops 24, 25 press the resilient element 9' completely together and enable a rigid force transmission via the resilient element 9' without resilient influence. As already described above, a high pressing force can thus be applied in order during the assembly to press the projections 13 effectively into the liner 3. Under this high pressure and during the subsequent pressure test, the liner material will flow slightly and the liner 3 is pressed out of the pressing region between the boss 4 and pressure ring 8'. The liner 3 becomes slightly thinner in this region. This is carried out until a gap is produced between the resilient element and stop 25 and the pressing thereby falls to the level of the resilient force of the resilient element 9. Consequently, the state as shown in FIG. 6*a* is achieved.

Furthermore, in this embodiment, the contact face for the sealing between the pressure ring 8' and liner 3 is configured to be inclined with respect to the perpendicular relative to the longitudinal axis L. In particular, an inclination of up to 20° is advantageous. Any air inclusions between the liner 3 and pressure ring 8' can be pressed radially out of the sealing face by the oblique positioning when screwing into the boss 4. This facilitates a reliable assembly.

Another variant for improving the sealing is not illustrated. This can also be used in combination with the projections. In this instance, a sealing ring, for example, an O-ring, can be placed in a groove on the boss. The groove is preferably located in the region of the boss 4, on which the liner 3 is pressed by the pressure ring 8. The grove may, however, also be provided outside this region. So that the sealing ring is not pressed into the gap between the boss 4 and liner 3 in the event of relatively high loads, a support ring may be provided. The internal gas pressure in the pressure tank and the pressing as a result of the resilient element 9 ensure that the liner 3 is applied in a uniform and effective sealing manner against the support ring.

LIST OF REFERENCE NUMERALS

1 Pressure tank
2 Hollow space
3 Liner
3*a* Portion of the liner
4, 4' Boss
5 Tank fitting
6 Reinforcement layer
7, 7' Bush
8, 8' Pressure ring
9, 9' Resilient element
10 Outer thread
11 Inner thread
12 Screw thread
13 Projections
14 Groove
15 Sealing ring
16 Support ring
17 Blow pin
18 Blow-molding tool
21 Stop on the bush
22 Stop on the pressure ring
23 Collar on the pressure ring
24 Stop on the pressure ring
25 Stop on the bush
L Longitudinal axis of the pressure tank
R Radial direction of the pressure tank

The invention claimed is:

1. A pressure tank for storing gas and for assembly in a gas-operated vehicle, the pressure tank comprising:
- a rotationally symmetrical elongate form having a central region with a cylindrical shape and two ends that are closed off with curved pole caps, and having a wall enclosing a hollow space for storing the gas;
- a metal connection piece, being a boss, on each of said pole caps;
- said wall including a reinforcement layer made of fiber-reinforced plastics material and an inner liner for sealing;
- a bush connected to said boss;
- a rigid pressure ring;
- a resilient element;
- said liner being disposed between the bush to boss connection and said pressure ring along a longitudinal axis L of the pressure tank;
- said resilient element being supported on said bush between said pressure ring and said bush and configured to press said pressure ring onto said liner and thus to press said liner onto said boss; and
- said pressure ring together with said bush completely surrounding said resilient element.

2. The pressure tank according to claim 1, wherein said resilient element is configured to orient a resilient force for pressing in a direction that is substantially parallel with the longitudinal axis L of the pressure tank or encloses with the longitudinal axis L of the pressure tank an angle of no more than a maximum of ±20°.

3. The pressure tank according to claim 1, wherein said pressure ring touches said liner with a face that is orientated substantially perpendicular to the longitudinal axis L of the pressure tank or that encloses an angle with respect to the longitudinal axis L of between 70° and 110°.

4. The pressure tank according to claim 1, wherein said resilient element is a cup spring.

5. The pressure tank according to claim 1, wherein said bush is secured to said boss by way of a screw thread, to enable a resilient force by which said pressure ring is pressed against said liner to be changed.

6. The pressure tank according to claim 1, wherein said bush has a collar on which said resilient element is supported, and said collar is oriented substantially perpendicularly to the longitudinal axis L of the pressure tank.

7. The pressure tank according to claim 1, wherein said boss has an outer thread in contact with a mating inner thread of said liner and arranged concentrically relative to the longitudinal axis L of the pressure tank.

8. The pressure tank according to claim 1, wherein a face of said pressure ring that is pressed onto said liner extends in a radial direction R at least 20 mm.

9. The pressure tank according to claim 1, wherein said boss is formed with projections in a region of said boss at which said liner is pressed onto said boss by said pressure ring, said projections having a height between 0.3 mm and 1.5 mm.

10. The pressure tank according to claim 1, wherein said pressure ring is displaceable relative to said bush in a direction of the longitudinal axis L of the pressure tank.

11. The pressure tank according to claim 10, wherein at least one of said pressure ring and said bush is formed with a stop configured to enable a rigid force transmission between said pressure ring and said bush in the direction of the longitudinal axis L via said resilient element when said resilient element is completely compressed.

12. A pressure tank for storing gas and for assembly in a gas-operated vehicle, the pressure tank comprising:
- a rotationally symmetrical elongate form having a central region with a cylindrical shape and two ends that are closed off with curved pole caps, and having a wall enclosing a hollow space for storing the gas;
- a metal connection piece, being a boss, on each of said pole caps;
- said wall including a reinforcement layer made of fiber-reinforced plastics material and an inner liner for sealing;
- a bush connected to said boss;
- a rigid pressure ring;
- a resilient element;
- said liner being disposed between the bush to boss connection and said pressure ring along a longitudinal axis L of the pressure tank;
- said resilient element being supported on said bush between said pressure ring and said bush and configured to press said pressure ring onto said liner and thus to press said liner onto said boss;

said pressure ring being displaceable relative to said bush in a direction of the longitudinal axis L of the pressure tank; and at least one of said pressure ring or said bush being formed with a stop configured to transmit a force between said pressure ring and said bush in the direction of the longitudinal axis L directly via the stop when said resilient element is compressed to a sufficient degree.

13. A method for producing a pressure tank according to claim 1, the method comprising:

constructing the wall of the pressure tank and performing a blow-molding process to form the liner that surrounds the hollow space for storing the gas;

arranging the bush to be connected to the boss, the rigid pressure ring, and the resilient element on a blow pin, while the liner is being produced with the blow-molding process such that the pressure ring and the resilient element are located, after the liner has been produced, on an inner side of the liner, wherein the resilient element can be supported on the bush and can press the pressure ring onto the liner and can press the liner onto a face of the boss when the bush is connected to the boss.

14. The method according to claim 13, which comprises, during the blow-molding process, displacing the pressure ring so far in a direction of a longitudinal axis of the pressure tank relative to the bush that the pressure ring compresses the resilient element so that a stop on the bush comes into direct contact with the pressure ring and/or a stop on the pressure ring comes into direct contact with the bush for force transmission.

15. The method according to claim 13, which further comprises connecting the boss to the liner and to the bush, connecting the boss and the bush by screwing the boss onto an outer thread of the bush, and screwing the boss so far onto the bush that the pressure ring is displaced in the direction of the longitudinal axis L relative to the bush and that the pressure ring compresses the resilient element until, for force transmission, a stop on the bush comes into direct contact with a counter-face on the pressure ring and/or a stop on the pressure ring comes into direct contact with a respective counter-face on the bush.

16. The method according to claim 13, which comprises, during the blow-molding process, displacing the pressure ring so far in the direction of the longitudinal axis L relative to the bush to completely compress the resilient element and to effect a rigid force transmission between the bush and the pressure ring via the resilient element.

17. The method according to claim 16, wherein the rigid force transmission is effected through a stop on the pressure ring and/or a stop on the bush.

18. The method according to claim 13, which further comprises connecting the boss to the liner and to the bush by screwing the boss onto an outer thread of the bush, and thereby screwing the boss so far onto the bush that the pressure ring is displaced in a direction of the longitudinal axis L relative to the bush and the pressure ring compresses the resilient element completely until a rigid force transmission between the bush and the pressure ring is effected via the resilient element.

19. The method according to claim 18, wherein the rigid force transmission further comprises connecting the boss to the liner and to the bush via a stop on the pressure ring and/or a stop on the bush.

* * * * *